United States Patent [19]

Simon

[11] Patent Number: 5,515,286
[45] Date of Patent: May 7, 1996

[54] METHOD AND DEVICE FOR PREVENTING AERODYNES FROM COLLIDING WITH RELIEF OBSTACLES

[75] Inventor: Georges-Henri Simon, Wissous, France

[73] Assignee: Sextant Avionique, Meudon la Foret, France

[21] Appl. No.: 387,236

[22] Filed: Feb. 13, 1995

[30] Foreign Application Priority Data

Mar. 24, 1994 [FR] France ................................. 94 04118

[51] Int. Cl.$^6$ .............................. G08G 5/04; G01C 5/00
[52] U.S. Cl. ......................... 364/461; 364/449; 364/456; 342/455; 340/961
[58] Field of Search ..................... 364/460, 461, 364/462, 449, 451, 456; 342/29, 32, 30, 37, 357, 455; 340/961, 963, 945, 951

[56] References Cited

U.S. PATENT DOCUMENTS

| | | | |
|---|---|---|---|
| 4,161,729 | 7/1979 | Schneider | 342/32 |
| 4,197,538 | 4/1980 | Stocker | 342/32 |
| 4,380,050 | 4/1983 | Tanner | 364/461 |
| 4,454,510 | 6/1984 | Crow | 342/32 |
| 4,646,244 | 2/1987 | Bateman et al. | 364/461 |
| 4,782,450 | 11/1988 | Flax | 364/461 |
| 4,853,700 | 8/1989 | Funatsu et al. | 342/30 |
| 5,111,400 | 5/1992 | Yoder | 364/424.01 |
| 5,153,836 | 10/1992 | Fraughton et al. | 364/461 |
| 5,252,978 | 10/1993 | Priestley | 342/29 |
| 5,317,316 | 5/1994 | Sturm et al. | 342/32 |
| 5,381,140 | 1/1995 | Kuroda et al. | 340/961 |

FOREIGN PATENT DOCUMENTS

| | | |
|---|---|---|
| 0565399 | 10/1993 | European Pat. Off. . |
| 8503566 | 8/1985 | WIPO . |
| 9221077 | 11/1992 | WIPO . |

OTHER PUBLICATIONS

Crow et. al., "Integrated Global Surveillance and Navigation System", IEEE 94, pp. 186–193.
Young, "Warning System Concepts to Prevent Controlled Flight into Terrain (CFIT)", IEEE 1993, pp. 463–468.
Williamson et al., "Development and Operation of the Traffic Alert and Collision Avoidance System", IEEE 1989, pp. 1735–1744.

*Primary Examiner*—Kevin J. Teska
*Assistant Examiner*—Tan Q. Nguyen
*Attorney, Agent, or Firm*—Browdy and Neimark

[57] ABSTRACT

The method embodying the invention comprises the periodical drawing up and transmission, on board an aerodyne, of a tracking message comprising a code identifying the aerodyne and navigational data, to an air surveillance station for a geographical area, permanent monitoring by said station and reception of tracking messages transmitted by the aerodynes in the vicinity, determination of their respective future paths within said geographical area, detection by said station of the risks of collision of each aerodyne with a relief obstacle, and drawing up by said station of the avoidance commands to be performed by the pilot of the aerodyne and transmission of these commands to the pilot. This method does not implement any specific autonomous system, while providing a high degree of security.

8 Claims, 2 Drawing Sheets

METHOD AND DEVICE FOR PREVENTING AERODYNES FROM COLLIDING WITH RELIEF OBSTACLES

BACKGROUND OF THE INVENTION

1. Field of the Invention

This invention relates to a method of detecting and determining the risks of aerodynes colliding with relief obstacles, in particular during the flight stages at which the aerodyne is at a low altitude, i.e. prior to landing and after take-off.

It applies notably, though not exclusively, to middle- and long-distance air transportation and to landing strips surrounded by hilly relief.

2. Description of the Prior Art

At present, numerous air crashes have occurred due to the presence of mountains or hills near landing strips or during flight at low altitudes.

Moreover, most medium- and long-distance transport aerodynes are deemed to be equipped with an ADS (Automatic Dependent Surveillance) system whose role it is to combine the data relating to position, speed and route provided by the navigational instruments, to associate them with the information identifying the aerodyne, and to periodically transmit these data via Hertzian waves in the form of messages towards an air surveillance station situated on the ground within radioelectric range.

OBJECT OF THE INVENTION

The main object of this invention is to operate such a system for determining the presence of obstacles on the path of the aerodyne, and, if necessary, for determining the avoidance manoeuvers to be performed by the pilot.

SUMMARY OF THE INVENTION

Accordingly, there is provided a method for preventing an aerodyne from colliding with obstacles formed by the relief flown over. This method is characterized in that it comprises the following stages:

- periodically, on board said aerodyne, the reading of navigational data specific to this aerodyne, the drawing up of a tracking message comprising a code identifying the aerodyne and said navigational data, and the transmission of this tracking message via Hertzian waves to an air surveillance station for a geographical area entrusted to it,
- the permanent monitoring by said station and the reception of messages transmitted by neighboring aerodynes located in said area, p1 the identification by said station of the aerodynes in the vicinity and the determination of their respective future paths, by means of the navigational data contained in the tracking messages received,
- for each aerodyne identified, the localizing by said station of the future path of said aerodyne in said geographical area, the appraisal by said station of the risk of said aerodyne colliding with an obstacle of the relief by means of said localized future path, and if a risk of collision is detected, the drawing up by said station of the avoidance commands, to be performed by the pilot of the aerodyne, and transmission of said commands to the pilot, in the form of an avoidance message.

This method provides greater security than that provided by a GPWS (Ground Proximity Warning System) type autonomous system which does not in any way enable an accurate determining of the configuration of the surrounding relief needed to draw up an efficient and sufficiently safe obstacle avoidance strategy. Furthermore, this result is achieved without making the electronic equipment of medium- and long-distance transport aerodynes any heavier.

Advantageously, the method embodying the invention comprises the insertion, in the tracking message, of an indicator of the start of the descent phase when the aerodyne is in the approach phase of the planned landing strip. This indicator enables the air surveillance station to determine what avoidance strategy to apply. In fact, when the aerodyne is in such a flight phase, it is normal that its path should intercept the ground. In this case the station will not provide it with any avoidance commands, but will simply signal to it the obstacles situated on its path.

To implement this method, the available "DATA LINK" transmission channel will be used to receive and process avoidance messages, to enable the pilot to indicate to it the start of the descent phase and to provide the possibility of inserting this indicator in the tracking message.

At the ground station end, the method is implemented by a computer with access to a cartographic data base describing the geographical area to be monitored. This computer is designed to process all the tracking messages received by the station and to follow, in correlation with the cartographic data to which it has access, the respective paths of the aerodynes that have transmitted tracking messages. From this processing, it determines what obstacles are situated on these paths and draws up obstacle avoidance commands which are then transmitted to the aerodynes in question. To do so, it completes the last tracking message received from the aerodyne with the avoidance commands thus determined.

BRIEF DESCRIPTION OF THE DRAWINGS

Further features and advantages of the invention will be apparent from an embodiment of the method according to the invention described, by way of a non-limiting example, in reference to the corresponding accompanying drawings in which.

DESCRIPTION OF THE PREFERRED EMBODIMENTS

Figure 1:
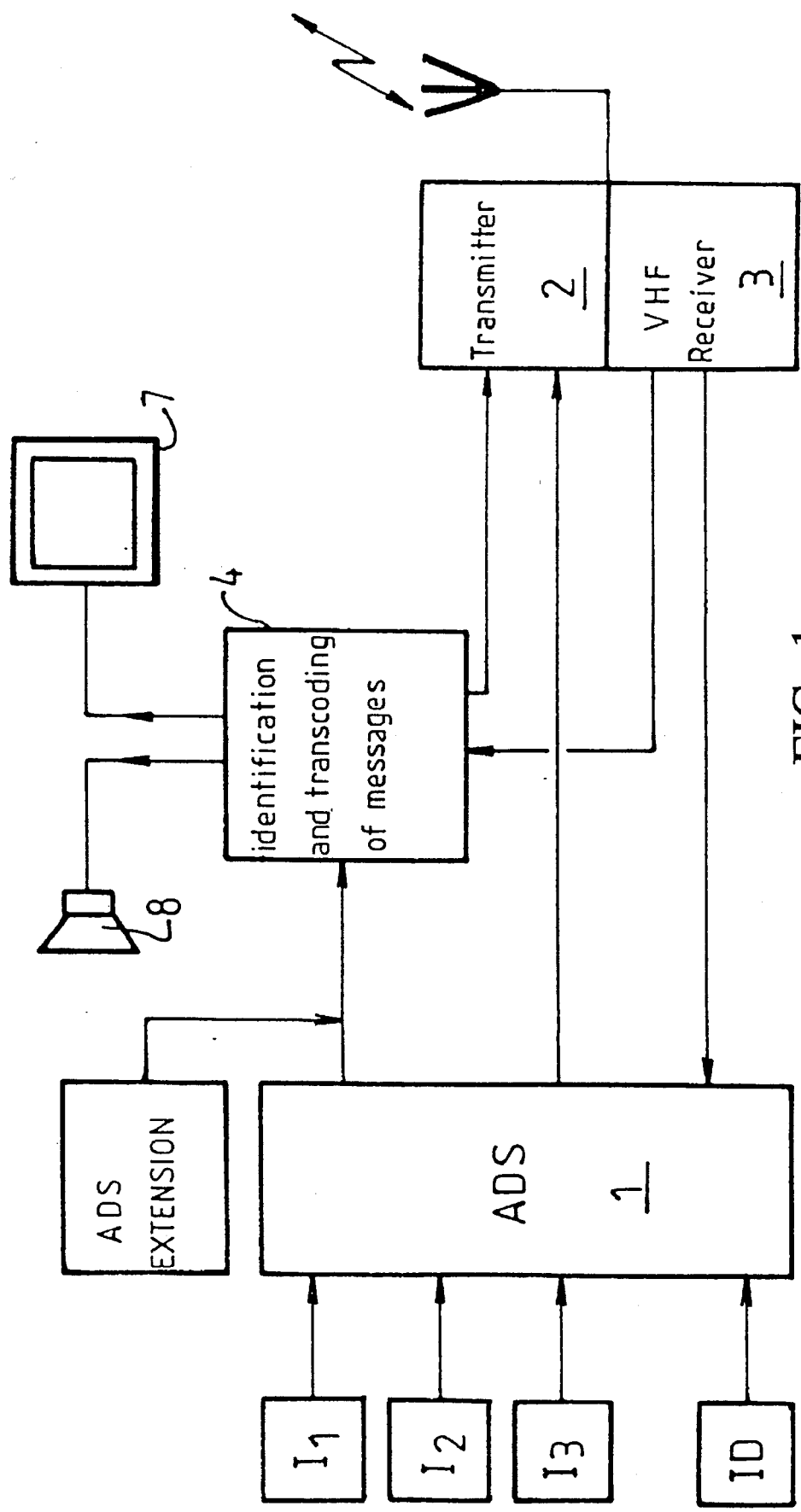
FIG. 1 schematically represents a system preventing collision with the ground, installed on board an aerodyne.

In the example represented in FIG. 1, the collision avoidance system comprises an ADS (Automatic Dependent Surveillance) system 1, navigation instruments I1, I2, I3 connected to the ADS system, a transmitter 2 and a VHF receiver 3 with the capacity to transmit data, and a unit 6 extending the ADS system 1.

Furthermore, the system comprises a box 4 identifying and transcoding the "DATA LINK" messages received by the aerodyne and coming from the ground, linked up to a viewing means such as a screen 7, and a sonorous warning means 8.

The ADS extension unit 6 enables the velocity vector and a "starting descent" indicator to be transmitted.

The ADS system 1 and its extension unit 6 are designed to perform the following operations:

- periodical reading of the navigational data coming from the navigation instruments I1, I2, I3, and the identification block ID,
- at each reading, the constitution of a message tracking the aerodyne by means of a code identifying the aerodyne and said navigational data, and the transferral of this message to the transmitter 2 for transmission to an air surveillance station,
- upon detection of the start of the approach phase prior to landing, the insertion of a "starting descent pip" in the tracking message to be transmitted.

The transmission of a message to the ground-level station is performed automatically and periodically, and implies a sequence of actions defined hereinunder.

The receiver 3 permanently monitors the transmission channels and detects the periods of time during which these channels are free. As soon as it detects that a channel is free, it informs the transmitter 2 that it may transmit. While the transmitter 2 is transmitting, the receiver 3 stays tuned to monitor the transmission and to ensure that the latter is not interfered with by another user of the channel. Should this happen, the receiver advises the transmitter that its message has not been properly transmitted and that it must be retransmitted.

The receiver 3 continues to permanently monitor and transmit all data messages it receives from the ground-level station to the identification and transcoding box 4 which selects the messages concerning it by means of the aerodyne's identification code.

If these messages contain indications of risk of collision with the ground or avoidance commands, it informs the pilot accordingly by transmitting this information to the visual 7 or sonorous 8 warning means.

Figure 2:
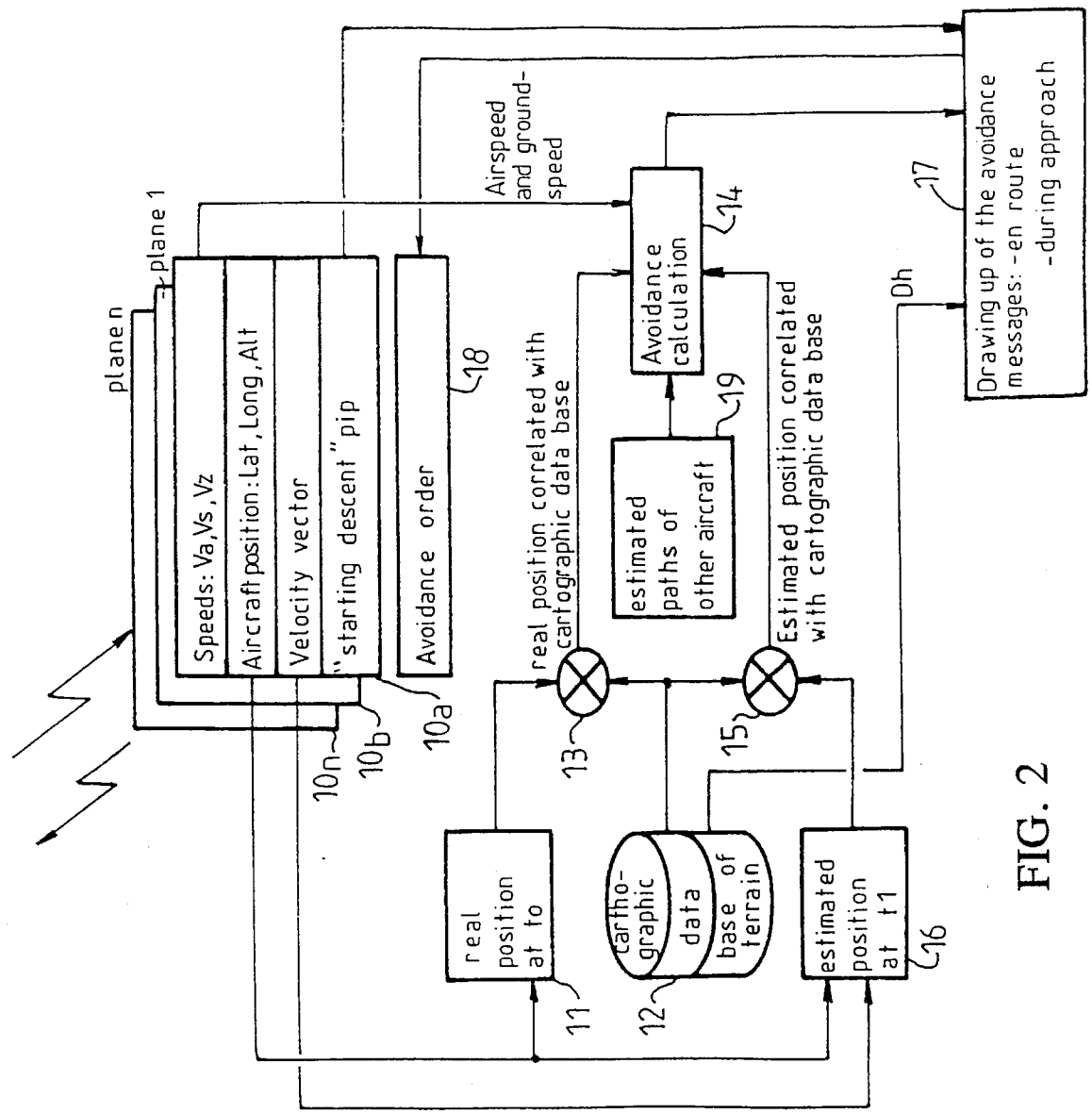
FIG. 2 schematically represents the processing of the data coming from an aerodyne and performed at the ground-level station.

In FIG. 2, all the tracking messages 10a, 10b, ... 10n, from the different aircraft received by the station situated on the ground are stored by order of arrival and are processed one after the other by a computer linked up to Hertzian wave transmitting and receiving means and having access to a cartographic data base 12 of the geographical area monitored by the station.

This data base notably comprises the altitudes of a multiplicity of points evenly distributed over the entire geographical area under consideration.

The tracking messages 10a, 10b, ... 10n, notably contain:

- a code identifying the transmitting aerodyne,
- the airspeed, ground speed and vertical velocity of the aerodyne,
- its position in terms of longitude, latitude and altitude,
- its velocity vector,
- the date t0 at which the navigational data contained in the message were read, and possibly,
- a "starting descent" indicator indicating whether the aerodyne has started the phase of approach to the landing strip.

In order to process each tracking message 10a received, the station's computer reads the aerodyne position provided in this message. This position corresponds to the real position 11 at date t0. It serves to position the aerodyne and its path within the geographical area monitored in relation to the different cartographic objects read in the data base 12.

This real position at date t0 and the velocity vector, provided by the tracking message, are then used by the computer to determine the future path of the aerodyne and to estimate the position 16 of the aerodyne a predetermined period of time later, i.e. at date t1 equal e.g. to t0+20 seconds. The portion of path between the position 11 at t0 and the estimated position 16 at t1 is then located in space in the geographical area monitored by means of the cartographic data in the data base 12.

If this portion of path intercepts an obstacle in the relief, the computer performs an avoidance calculation from the following data:

- the real position at t0 and the estimated position at t1,
- the airspeed and ground speed at t0,
- the configuration of the relief between the positions 11 at t0 and 16 at t1,
- the height known as "decision" height Dh corresponding to minimum height for overshooting and deferring the landing, provided by the data base 12,
- the respective estimated paths 19 of the other aerodynes.

This calculation determines the path that the aerodyne must follow to avoid the obstacle, taking into account the capacities of the aerodyne. The station computer then determines the piloting commands 18 to be performed in order to avoid the collision.

These commands 18 are transmitted by the station. In this way, the aerodyne identified by the identification code included in the message can pick up the latter and recognize that it is addressed to it.

In the event of the aerodyne having started its descent phase ("starting descent" indicator on), only the presence of the obstacle and the distance thereto are indicated in the message sent back towards the aerodyne.

In this manner, the system can receive all messages containing avoidance orders or indications of obstacles. The information thus received is transferred to the viewing means 7 and sonorous warning means 8, while an acknowledgement message is sent to the station.

As long as the station has not received an acknowledgement message, it repeats transmission of the avoidance message.

I claim:

1. A device for preventing collisions between an aerodyne and obstacles formed by relief of a geographical area flown over by said aerodyne, said device comprising:

a computer, provided in a ground station for air surveillance of said geographical area, said computer being linked up to Hertzian waves communication means and to a geographical data base describing the relief of said geographical area;

data acquisition means, provided in said aerodyne, for automatically and periodically acquiring navigation data representative of a current position and further flight path of said aerodyne, and for drawing up tracking messages each comprising an identification code of said aerodyne and said navigation data associated with a date of acquisition;

Hertzian waves communication means, provided in said aerodyne for sending said tracking messages, said tracking messages being received by the communication means of the ground station when said aerodyne is flying over said geographical area, display means, provided in said aerodyne, for displaying information sent by the communication means of the ground station and received by the communication means of said aerodyne;

said computer comprising:

means for permanently monitoring said tracking messages received by the communication means of the ground station, means for identifying said aerodyne with said identification code contained in each of said tracking messages, means for estimating and localizing in said geographical area the further flight path of said aerodyne, by means of the navigation data contained in each of said tracking messages and said geographical data base, and for determining risks of collisions of said aerodyne with obstacles of relief, computation means for drawing up avoidance flight commands to be performed by a pilot of said aerodyne so as to prevent said aerodyne from colliding with an obstacle of relief, said computation means using said geographical data base, said estimated further flight path and estimated further flight paths of other aerodynes flying over said geographical area, means for drawing up avoidance messages comprising a last received tracking message from said aerodyne, an indication on said risks of collision and said avoidance flight commands, said avoidance message being transmitted to said aerodyne and displayed on said display means.

2. The device as claimed in claim 1, wherein a tracking message of said aerodyne comprises:

identification code of said aerodyne, airspeed, ground speed and vertical velocity, real position in terms of longitude, latitude and altitude, and velocity vector thereof.

3. The device as claimed in claim 2, wherein said estimating means estimate said further flight path of said aerodyne by means of the real position and velocity vector provided in a last tracking message received from said aerodyne, and estimate a position said aerodyne will occupy a predetermined period of time later.

4. The device as claimed in claim 3, wherein, if the estimated flight path during said period of time intercepts an obstacle, said computation means determine said avoidance flight commands from the following data:

the real position provided in the last tracking message and the estimated position, the airspeed and ground speed provided by said last tracking message, a configuration of the relief between said real position and said estimated position, provided by said geographical data base, a decision height corresponding to the minimum height for overshooting and deferring a landing, provided by said geographical data base, respective estimated further flight paths of other aerodynes detected within radioelectric range of said ground station.

5. The device as claimed in claim 2, wherein each of said tracking messages further comprises a starting descent indicator which indicates whether the aerodyne has begun an approach phase to a landing strip, this indicator in said tracking message being used by said computation means to determine which avoidance strategy to apply when a risk of collision is detected.

6. The device as claimed in claim 2, wherein each of said tracking messages further comprises a starting descent indicator which indicates whether the aerodyne has begun an approach phase to a landing strip, this indicator in said tracking message indicating to said computing means that the presence of an obstacle and the distance thereto must be simply signalled in the avoidance message returned.

7. The device as claimed in claim 1, said communication means of said aerodyne comprising:

means for permanently monitoring and receiving avoidance messages transmitted by said ground station, means for selecting said avoidance messages received concerning said aerodyne by means of identification code thereof, means for transmitting said indication on said risks and said avoidance commands to said display means, and means for transmitting an acknowledgement message to said station after one avoidance message being selected by said selecting means.

8. The device as claimed in claim 1, wherein said geographical data base comprises altitudes of a multiplicity of points evenly distributed over the entire geographical area.

\* \* \* \* \*